United States Patent
Edara et al.

(10) Patent No.: US 12,423,003 B2
(45) Date of Patent: *Sep. 23, 2025

(54) SYNCHRONOUS REPLICATION OF HIGH THROUGHPUT STREAMING DATA

(71) Applicant: Google LLC, Mountain View, CA (US)

(72) Inventors: Pavan Edara, Mountain View, CA (US); Jonathan Forbes, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,834

(22) Filed: Feb. 9, 2023

(65) Prior Publication Data

US 2023/0195331 A1 Jun. 22, 2023

Related U.S. Application Data

(63) Continuation of application No. 17/098,306, filed on Nov. 13, 2020, now Pat. No. 11,579,778.

(51) Int. Cl.
G06F 3/06 (2006.01)
G06F 11/14 (2006.01)
G06F 11/30 (2006.01)

(52) U.S. Cl.
CPC .......... *G06F 3/0619* (2013.01); *G06F 3/0635* (2013.01); *G06F 3/064* (2013.01);
(Continued)

(58) Field of Classification Search
CPC ...... G06F 3/0619; G06F 3/0635; G06F 3/064; G06F 3/065; G06F 3/0653; G06F 3/0659;
(Continued)

(56) References Cited

U.S. PATENT DOCUMENTS 7,617,369 B1  11/2009  Bezbaruah et al.
10,452,680 B1 * 10/2019  Fan .................. G06F 16/27
(Continued)

FOREIGN PATENT DOCUMENTS

JP  2009003769 A  1/2009
JP  2014130475 A  7/2014
(Continued)

OTHER PUBLICATIONS

Mar. 11, 2022 Written Opinion (WO) of the International Searching Authority (ISA) and International Search Report (ISR) issued in International Application No. PCT/US2021/058841.
(Continued)

*Primary Examiner* — Eric Cardwell
(74) *Attorney, Agent, or Firm* — Shumaker & Sieffert, P.A.

(57) ABSTRACT

A method for synchronous replication of stream data includes receiving a stream of data blocks for storage at a first storage location associated with a first geographical region and at a second storage location associated with a second geographical region. The method also includes synchronously writing the stream of data blocks to the first storage location and to the second storage location. While synchronously writing the stream of data blocks, the method includes determining an unrecoverable failure at the second storage location. The method also includes determining a failure point in the writing of the stream of data blocks that demarcates data blocks that were successfully written and not successfully written to the second storage location. The method also includes synchronously writing, starting at the failure point, the stream of data blocks to the first storage location and to a third storage location associated with a third geographical region.

18 Claims, 9 Drawing Sheets

(52) U.S. Cl.
CPC ............ *G06F 3/065* (2013.01); *G06F 3/0653* (2013.01); *G06F 3/0659* (2013.01); *G06F 3/067* (2013.01); *G06F 11/1446* (2013.01); *G06F 11/1471* (2013.01); *G06F 11/3034* (2013.01)

(58) Field of Classification Search
CPC .. G06F 3/067; G06F 11/1435; G06F 11/1446; G06F 11/1471; G06F 11/3034
See application file for complete search history.

(56) References Cited

U.S. PATENT DOCUMENTS

| | | |
|---|---|---|
| 11,579,778 B2 | 2/2023 | Edara et al. |
| 11,720,456 B2 | 8/2023 | Taranov et al. |
| 2005/0256972 A1 | 11/2005 | Cochran et al. |
| 2006/0182050 A1 | 8/2006 | Dohm |
| 2007/0195692 A1 | 8/2007 | Hagglund et al. |
| 2009/0070528 A1* | 3/2009 | Bartfai ............... G06F 11/2082 711/114 |
| 2014/0189425 A1 | 7/2014 | Ochi |
| 2015/0339366 A1* | 11/2015 | Laiho ..................... G06F 16/27 707/610 |
| 2020/0389546 A1* | 12/2020 | Kumarasubramanian .................. H04L 65/61 |
| 2021/0165573 A1* | 6/2021 | Demoor ............. G06F 11/1415 |

FOREIGN PATENT DOCUMENTS

| | | |
|---|---|---|
| KR | 1020140038450 A | 3/2014 |
| KR | 1020160016358 A | 2/2016 |

OTHER PUBLICATIONS

Decision to Grant from counterpart Japanese Application No. 2023528455 dated Oct. 25, 2023, 8 pp.
First Examination Report from counterpart Indian Application No. 202347038723 dated Feb. 6, 2025, 8 pp.
International Search Report and Written Opinion of International Application No. PCT/US2021/058841 dated Mar. 11, 2022, 10 pp.
Notice of Intent to Grant and Text Intended to Grant from counterpart European Application No. 21823416.9 dated Mar. 17, 2025, 90 pp.
Prosecution History from U.S. Appl. No. 17/098,306, now issued U.S. Pat. No. 11,579,778, dated Feb. 3, 2022 through Oct. 19, 2022, 63 pp.
Response to Communication Pursuant to Rules 161(1) and 162 EPC dated Jun. 21, 2023, from counterpart European Application No. 21823416.9, filed Dec. 6, 2023, 23 pp.
Response to First Examination Report dated Feb. 6, 2025, from counterpart Indian Application No. 202347038723 filed Jun. 5, 2025, 24 pp.
Office Action, and translation thereof, from counterpart Korean Application No. 10-2023-7019450 dated Aug. 8, 2025, 16 pp.

* cited by examiner

SYNCHRONOUS REPLICATION OF HIGH THROUGHPUT STREAMING DATA

CROSS REFERENCE TO RELATED APPLICATIONS

This U.S. patent application is a continuation of, and claims priority under 35 U.S.C. § 120 from, U.S. patent application Ser. No. 17/098,306, filed on Nov. 13, 2020. The disclosure of this prior application is considered part of the disclosure of this application and is hereby incorporated by reference in its entirety.

TECHNICAL FIELD

This disclosure relates to synchronous replication of high throughput streaming data.

BACKGROUND

Cloud computing has increased in popularity as storage of large quantities of data in the cloud becomes more common. The need for robust storage of data has also grown to protect the increasingly large quantity of data stored in the cloud. Some cloud service providers increase the robustness of cloud data storage by asynchronously storing data at multiple storage locations across different geographical zones. For example, after writing the data to a first or primary storage location in a first zone, the data is then written to a second storage location in a second zone. Storing the data at these different storage locations allows users to recover their data in the event that one of the storage locations becomes inaccessible. For some data, such as for mission critical applications, data loss is intolerable.

SUMMARY

One aspect of the disclosure provides a method for synchronous replication of high throughput streaming data. The method includes receiving, at data processing hardware, a stream of data blocks for storage at a first storage location of a distributed storage system and at a second storage location of the distributed storage system. The first storage location is associated with a first geographical region and the second storage location is associated with a second geographical region different than the first geographical region. The method also includes synchronously writing, by the data processing hardware, the stream of data blocks to the first storage location and to the second storage location. While synchronously writing the stream of data blocks to the first storage location and to the second storage location, the method includes determining, by the data processing hardware, an unrecoverable failure at the second storage location that prohibits further writing of the stream of data blocks to the second storage location. The method also includes determining, by the data processing hardware, a failure point in the writing of the stream of data blocks. The failure point demarcates data blocks that were successfully written to the second storage location and data blocks that were not successfully written to the second storage location. The method also includes synchronously writing, by the data processing hardware, starting at the failure point, the stream of data blocks to the first storage location and to a third storage location of the distributed storage system. The third storage system is associated with a third geographical region different than the first geographical region and the second geographical region.

Implementations of the disclosure may include one or more of the following optional features. In some implementations, the method further includes, asynchronously writing, by the data processing hardware, the stream of data blocks to third storage location from a beginning point of the stream of data blocks to the failure point. In some examples, determining the unrecoverable failure at the second storage location that prohibits further writing of the stream of data blocks to the second storage location includes determining a failure of the writing of the stream of data blocks to the second storage location; in response to determining the failure of writing the stream of data blocks to the second storage location, retrying to write the stream of data blocks to the second storage location; and when retrying to write the stream of data blocks to the second storage location has failed, determining that the failure is an unrecoverable failure.

Optionally, determining the failure point in the writing of the stream of data blocks includes determining whether a first replication log is available which indicates the data blocks that have been successfully committed to the first storage location; determining whether a second replication log is available which indicates the data blocks that have been successfully committed to the second storage location; and when the first replication log and the second replication log are available, reconciling, based on a length of the first replication log and a length of the second replication log, the first replication log and the second replication log. In some examples, reconciling the first replication log and the second replication log includes determining an index of the second replication log associated with the unrecoverable failure; storing the index of the second replication log on memory hardware in communication with the data processing hardware; finalizing the second replication log to prohibit further writes to the second storage location; and generating a sentinel file to indicate a need for reconciliation. In other examples, when the first replication log is available and the second replication log is not available, the method further includes reconciling, by the data processing hardware, based on the length of the first replication log, the first replication log and the second replication log. When the first replication log is not available and the second replication log is available, the method may further include reconciling, by the data processing hardware, the first replication log and the second replication log based on the length of the second replication log.

In some implementations, the method further includes, generating, by the data processing hardware, a first replication log includes timestamps which indicates when each data block is written to the first storage location and generating, by the data processing hardware, a second replication log that includes timestamps which indicate when each data block is written to the second storage location. In these implementations, the method further includes, receiving, at the data processing hardware, a query request requesting return of a plurality of data blocks stored at the first storage location; reconciling, by the data processing hardware, based on a length of the first replication log and a length of the second replication log, the first replication log and the second replication log; and returning, by the data processing hardware, based on the reconciliation of the first replication log and the second replication log, the requested plurality of data blocks. Optionally, reconciling the first replication log and the second replication log includes determining that the length of the second replication log is not available and determining, within a threshold period of time, that a subsequent write is added to the first replication log.

Another aspect of the disclosure provides a system for synchronous replication of high throughput streaming data. The system includes data processing hardware and memory hardware in communication with the data processing hardware. The memory hardware storing instructions that when executed on the data processing hardware cause the data processing hardware to perform operations. The operations include receiving a stream of data blocks for storage at a first storage location of a distributed storage system and at a second storage location of the distributed storage system. The first storage location is associated with a first geographical region and the second storage location is associated with a second geographical region different than the first geographical region. The operations also include synchronously writing the stream of data blocks to the first storage location and to the second storage location. While synchronously writing the stream of data blocks to the first storage location and to the second storage location, the operations include determining an unrecoverable failure at the second storage location that prohibits further writing of the stream of data blocks to the second storage location. The operations also include determining a failure point in the writing of the stream of data blocks. The failure point demarcates data blocks that were successfully written to the second storage location and data blocks that were not successfully written to the second storage location. The operations also include synchronously writing, starting at the failure point, the stream of data blocks to the first storage location and to a third storage location of the distributed storage system. The third storage system is associated with a third geographical region different than the first geographical region and the second geographical region.

Implementations of the disclosure may include one or more of the following optional features. In some implementations, the operations also include, asynchronously writing the stream of data blocks to third storage location from a beginning point of the stream of data blocks to the failure point. In some examples, determining the unrecoverable failure at the second storage location that prohibits further writing of the stream of data blocks to the second storage location includes determining a failure of the writing of the stream of data blocks to the second storage location; in response to determining the failure of writing the stream of data blocks to the second storage location, retrying to write the stream of data blocks to the second storage location; and when retrying to write the stream of data blocks to the second storage location has failed, determining that the failure is an unrecoverable failure.

Optionally, determining the failure point in the writing of the stream of data blocks includes determining whether a first replication log is available which indicates the data blocks that have been successfully committed to the first storage location; determining whether a second replication log is available which indicates the data blocks that have been successfully committed to the second storage location; and when the first replication log and the second replication log are available, reconciling, based on a length of the first replication log and a length of the second replication log, the first replication log and the second replication log. In some examples, reconciling the first replication log and the second replication log includes determining an index of the second replication log associated with the unrecoverable failure; storing the index of the second replication log on memory hardware in communication with the data processing hardware; finalizing the second replication log to prohibit further writes to the second storage location; and generating a sentinel file to indicate a need for reconciliation. In other examples, when the first replication log is available and the second replication log is not available, the operations further include reconciling, based on the length of the first replication log, the first replication log and the second replication log. When the first replication log is not available and the second replication log is available, the operations further include reconciling the first replication log and the second replication log based on the length of the second replication log.

In some implementations, the operations further include, generating a first replication log includes timestamps which indicates when each data block is written to the first storage location and generating a second replication log that includes timestamps which indicate when each data block is written to the second storage location. In these implementations, the operations further include, receiving a query request requesting return of a plurality of data blocks stored at the first storage location; reconciling, based on a length of the first replication log and a length of the second replication log, the first replication log and the second replication log; and returning, based on the reconciliation of the first replication log and the second replication log, the requested plurality of data blocks. Optionally, reconciling the first replication log and the second replication log includes determining that the length of the second replication log is not available and determining, within a threshold period of time, that a subsequent write is added to the first replication log.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
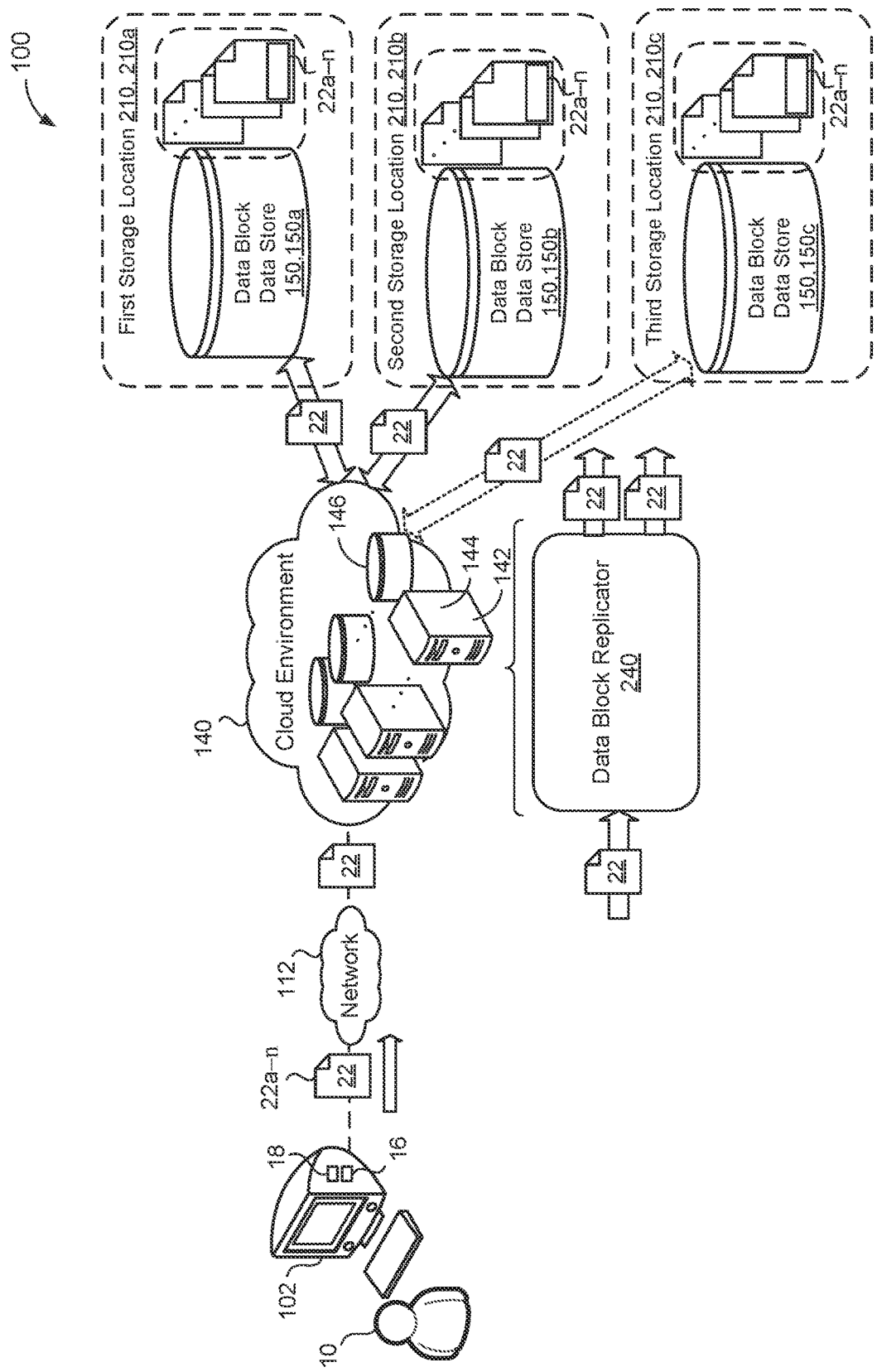
FIG. 1 is a schematic view of an example system for synchronous replication of streaming data.

As cloud data warehouses have increased in size and popularity, the amount of data that they ingest has increased exponentially. For example, some systems ingest (i.e., receive) hundreds of gigabytes a second if not more. This ingested data is often stored in multiple storage locations located in different geographical regions (i.e., "zones") such as a primary storage location and a secondary storage location to provide a backup for the data. The secondary storage location for the data acts as a failsafe that provides added protection for the data if the primary storage location is damaged or otherwise inaccessible. For example, when a natural disaster occurs in the geographical region of the first storage location the data is not accessible at the first storage location. In this example, the data remains accessible at the second storage location located in a different geographical region than the first storage location.

Conventional systems write data to the primary storage location upon data ingestion and acknowledge receipt of the data to the user. Then, an asynchronous background process replicates the data from the primary storage location to the secondary storage location. For example, after a period of time of inactivity at the first storage location (e.g., no new data has been received for fifteen minutes) or when a sufficient amount of data has been written to the primary storage location (e.g., 100 MBs), the asynchronous background process replicates and stores the same data from the primary storage location to the secondary storage location.

This asynchronous replication process leaves a window of vulnerability where a permanent failure that occurs at the first storage location can lead to irrecoverable data loss of the data. Specifically, when a failure at the first storage location occurs before the system writes the data via the asynchronous replication process to the second storage location, the data may be permanently lost because the data has not yet been stored at the secondary storage location.

In contrast, a synchronous replication process stores the streaming data received from a user at the primary storage location and secondary storage location simultaneously. Thus, if a failure occurs during or after writing the data to either the primary storage location or the secondary storage location, the data is still accessible at the other storage location. However, when failures occur during the synchronous replication to the primary storage location or the secondary storage locations the synchronous replication process failure handling must ensure that the data remains available and is still replicated properly. For example, when the secondary storage location becomes inaccessible while synchronously replicating the data to the primary storage location and the secondary storage location simultaneously, there is no complete backup for the data.

Implementations herein are directed toward a system for synchronously replicating streaming data to a first storage location and a second storage location simultaneously. The system manages failures that occur during the synchronous replication process such that streaming data always maintains availability at the primary storage location and/or the secondary storage location. For example, while synchronously writing the data blocks to the first storage location and the second storage location, the system determines an unrecoverable failure that prohibits additional data blocks from writing to the second storage location. In response to the failure, the system synchronously writes the stream of data blocks to the first storage location and a third storage location starting at the failure point of the unrecoverable failure.

Referring now to FIG. 1, in some implementations, an example system 100 includes a user device 102 associated with a respective user 12 in communication with a remote system 140 via a network 112. The user device 102 may correspond to any computing device, such as a desktop workstation, a laptop workstation, or a mobile device (i.e., a smart phone). The user device 102 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A plurality of data block data stores 150, 150a-c (i.e., remote storage devices 150) are overlain on the storage resources 142 to allow scalable use of the storage resources 142 by one or both of the user 10 and computing resources 144. The data block data stores 150 may each be configured to store a plurality of data blocks 22, 22a-n within a data structure (e.g., a table). Each data block data store 150 is associated with a storage location 210, 210a-c and each storage location 210 is associated with a different geographical region.

The user 10 transmits a stream of data blocks 22 using the user device 102 via the network 112 to the remote system 140 for storage at the remote system 140. The stream of data blocks 22 may include any number of data blocks 22. The remote system 140 receives the stream of data blocks 22 for storage at a first storage location 210a (e.g., a primary storage location 210) of the remote system 140 and at a second storage location 210b of the remote system 140 (e.g., a secondary storage location 210). The first storage location 210a is associated with a first geographical region and the second storage location 210b is associated with a second geographic region different than the first geographical region. For example, the first storage location 210a is located in New York City and the second storage location 210b is located in Los Angeles. Each storage location 210 of the remote system 140 includes one or more data block data stores 150 configured to store the stream of data blocks 22.

The remote system 140 executes a data block replicator 240 configured to replicate the stream of data blocks 22 received from the user device 102. That is, the data block replicator 240 duplicates each data block 22 of the stream of data blocks 22 into two separate streams of data blocks 22. By replicating the stream of data blocks 22 into two streams of data blocks 22, the data block replicator 240 may write the stream of data blocks 22 to the first storage location 210a and the second storage location 210b synchronously (i.e., simultaneously). For example, the stream of data blocks 22 represents some or all of a table that the remote system 140 stores at a data block data store 150a at the first storage location 210a (e.g., Los Angeles) and at a data block data store 150b at the second storage location 210b (e.g., New York City). The data block replicator 240 synchronously writes each data block 22 of the stream of data blocks 22 to both the first storage location 210a and the second storage location 210b at the same time or substantially at the same time. To ensure that the writes stay synchronous, the data block replicator 240 may transmit each pair of replicated data blocks 22 at or near the same time to the primary storage location 210a and the secondary storage location 210b and then wait to transmit the next data block 22 until the data block replicator 240 confirms that both receiving data block data stores 150 (e.g., the data block data store 150a and the data block data store 150b) received the previous data block 22. That is, each pair of replicated data blocks 22 are transmitted simultaneously and thus the data block replicator 240 maintains synchronicity throughout writing the stream of data blocks 22.

In some examples, the user 10 selects the primary storage location 210 (i.e., the first storage location 210a). For example, the user 10 selects that the primary storage location for the data is Los Angeles. In this example, either the user 10 or the remote system 140 selects the secondary storage location 210 (i.e., the second storage location 210b). For example, the remote system 140 prompts the user 10 to select a secondary storage location 210 that is different than the primary storage location 210. Alternatively, the remote system 140 automatically selects a secondary storage location 210 that is different than the primary storage location 210 based on any number of factors (e.g., location, distance from primary storage location 210, congestion, cost, latency, etc.). In other examples, the remote system 140 selects both the primary storage location 210 and the secondary storage location 210 automatically based on any of the same factors.

While synchronously writing the stream of data blocks 22 to the first storage location 210a and to the second storage location 210b, the remote system 140, in some implementations, determines an unrecoverable failure at the second storage location 210b that prohibits further writing of the stream of data blocks 22 to the second storage location 210b. For example, the second storage location 210b is subject to a natural disaster that physically damages the data block data store 150b of the second storage location 210b. In another example, the data block data store 150b of the second storage location 210b encounters network connection issues that prevent communication with the second storage location 210b and/or data block data store 150b. An unrecoverable error is defined as an error that persists for a threshold period of time and/or persists after a threshold number of retry attempts.

The unrecoverable failure may occur such that the data block replicator 240 only writes a portion of the data blocks 22 in the stream of data blocks 22 to the second storage location 210b. That is, the data block replicator 240 writes only a portion of the stream of data blocks 22 before the unrecoverable failure prohibits any further communication with the second storage location 210b and/or data block data store 150b. The remote system 140 determines a failure point 220 (FIGS. 2A and 2B) in the writing of the stream of data blocks 22. In particular, the failure point 220 indicates at which data block 22 in the stream of data blocks 22 the unrecoverable failure occurred at. That is, the failure point 220 demarcates the data blocks 22 that the remote system 140 successfully wrote to the second storage location 210b from the data blocks 22 that the remote system 140 did not successfully write to the second storage location 210b. While the examples herein describe the unrecoverable failure prohibiting further writing to the second storage location 210b, it is understood that the unrecoverable failure may occur between either the primary storage location 210 (e.g., the first storage location 210a) or the secondary storage location 210 (e.g., the second storage location 210b) and still remain within the scope of the implementations herein.

After determining the failure point 220 at the second storage location 210b, the data block replicator 240, starting at the failure point 220, synchronously writes the stream of data blocks 22 to the first storage location 210a and to a data block data store 150c of a third storage location 210c. The third storage location 210c is associated with a third geographical region (e.g., Miami) different than the first geographic region (e.g., Los Angeles) and the second geographical region (e.g., New York City).

Figure 2A:
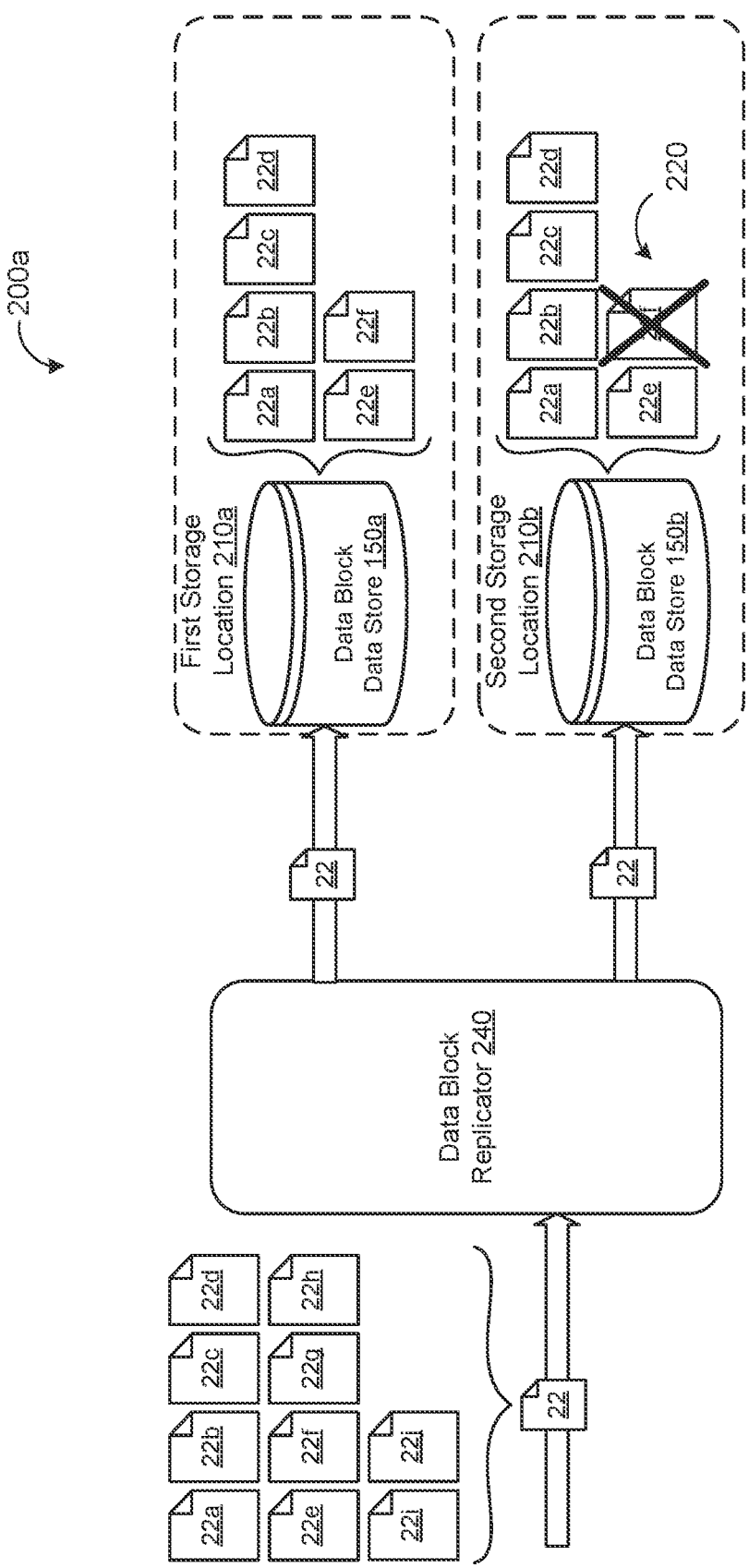
FIG. 2A is a schematic view of a failure of synchronous replication of streaming data to two different storage location.

Referring now to FIG. 2A, in some implementations, the data block replicator 240 receives the stream of data blocks 22 that include data blocks 22a-j. The data block replicator 240 replicates the stream of data blocks 22 (e.g., data blocks 22a-j) to write to both the first storage location 210a and the second storage location 210b simultaneously. That is, the data block replicator 240 replicates the stream of data blocks 22 into two streams of data blocks 22 (e.g., two streams of data blocks 22a-j) that allows the data block replicator 240 to synchronously write the stream of data blocks 22 to both the first storage location 210a and the second storage location 210b. That is, instead of writing the data blocks 22 asynchronously, such as by starting the writes to the second storage location 210b a period of time after starting the writes to the first storage location 210a, the data block replicator 240 synchronously writes each pair of replicated data blocks 22 to the first storage location 210a and the second storage location 210b.

After replicating the stream of data blocks 22, the data block replicator 240 writes each data block 22 of the stream of data blocks 22 to the data block data store 150a at the first storage location 210a and to the data block data store 150b at the second storage location 210b. While synchronously writing the stream of data blocks 22 to the first storage location 210a and second storage location 210b, the remote system 140 determines the unrecoverable failure at the second storage location 210b. The unrecoverable failure prohibits further writing of the stream of data blocks 22 to the second storage location 210b. In some implementations, the remote system 140 determines that a write of one of the data blocks 22 has failed. For example, the second storage location 210b waits for confirmation of the write of each data block 22 for a threshold period of time. Here, the write of the data block 22f to the second storage location 210b failed while the write of the data block 22f to the first storage location was successful. When the data block replicator 240 cannot determine that a write for each of a pair of replicated data blocks 22 (i.e., the data block 22 for the first storage location 210a and the corresponding data block 22 for the second storage location 210b) has occurred within the threshold period of time, the remote system 140 determines that the write of the data block 22 has failed.

In response to determining the failure of writing one of the data blocks 22 to the second storage location 210b (or, in other examples, the first storage location 210a), the remote system 140 may retry to write the stream of data blocks 22 to the second storage location 210b. For example, the second storage location 210b loses network connection to the remote system 140 momentarily but recovers network connectivity within the threshold period of time. Thus, the data block replicator 240 may attempt to transmit the failed data block 22 any number of times prior to determining that the failure is unrecoverable. Because the data block replicator writes the data blocks 22 to both the first storage location 210a and the second storage location 210b synchronously, the data block replicator 240 may refrain from writing any additional data blocks 22 to the first storage location 210a while retrying the failed write to the second storage location 210b.

When one of the retries to write the failed data blocks 22 is successful, the remote system 140 may determine that the failure is not an unrecoverable failure and continues to write the stream of data blocks 22 to both the first storage location 210a and the second storage location 210b. Where the remote system 140 determines that the one or more retries of the failed write is unsuccessful, the remote system 140 determines that the failure is an unrecoverable failure that prohibits further writing of the stream of data blocks 22 to the second storage location 210b. The data block replicator 240 determines the failure point 220 based on, for example, which data block 22 failed to write or based on the last successful data block 22 write. In the example of FIG. 2A, the data block replicator 240 determines that the failure point occurred between data blocks 22e (which the data block replicator 240 successfully wrote to the second storage location 210b) and the data block 22f (which the data block replicator 240 failed to write to the second storage location 210b).

In some examples, after the remote system 140 determines the unrecoverable failure at the second storage location 210b, the remote system 140 returns an error or an indication of the failure to the user 10. The indication may include details such as how many data blocks 22 were successfully written prior to the failure, the failure point 220, which storage location 210 the write failed on, etc.

Figure 2B:
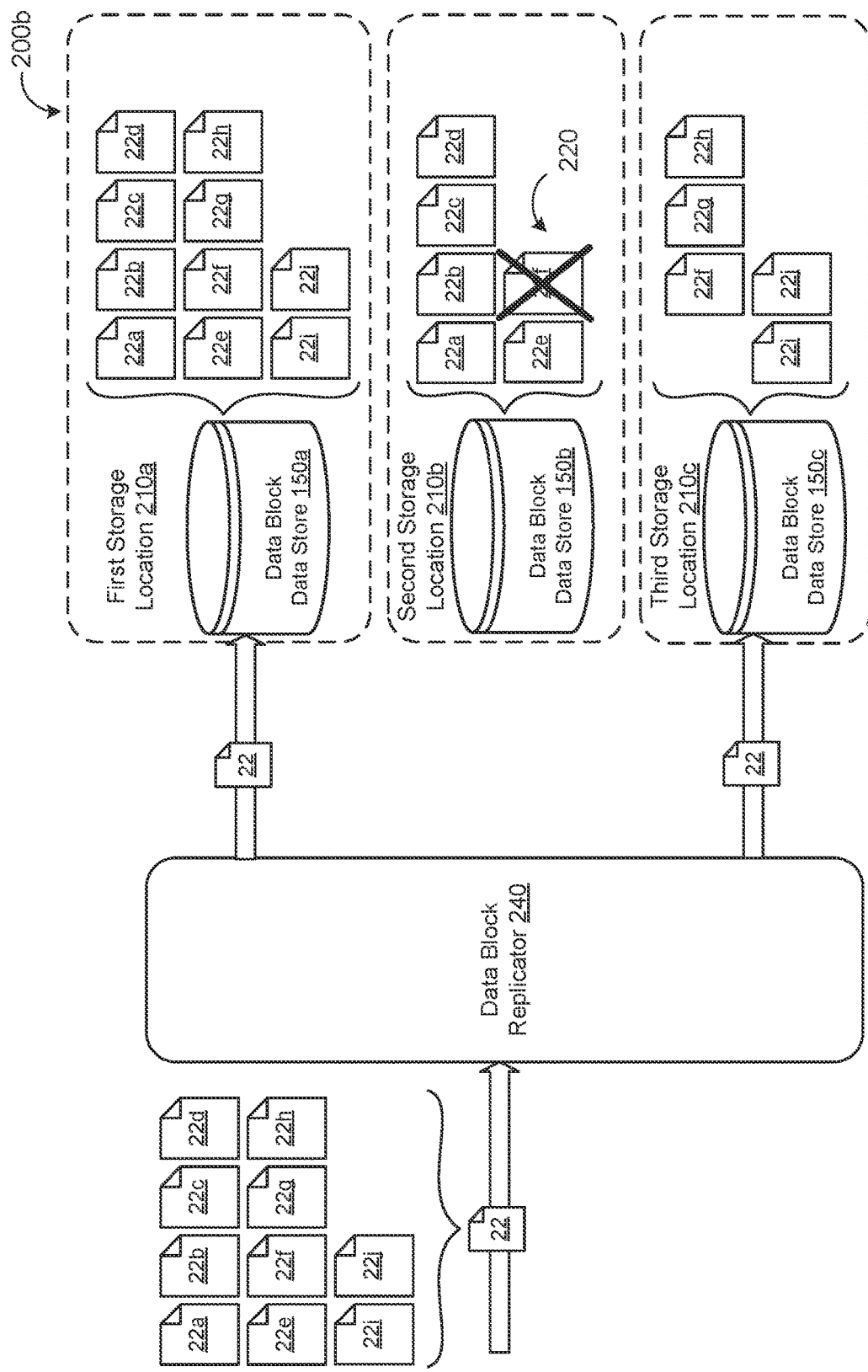
FIG. 2B is a schematic view of a recovery of synchronous replication of streaming data to a third different storage location.

Referring now to FIG. 2B, in some examples, after the remote system 140 determines the unrecoverable failure at the second storage location 210b and the failure point 220, the data block replicator 240, starting at the failure point 220, synchronously writes the stream of data blocks 22 to the first storage location 210a and the third storage location 210c. In particular, after the unrecoverable failure at the second storage location 210b, the data block replicator 240 stops attempting to write the data blocks 22 to the second storage location 210b and instead begins writing the data blocks 22 to the third storage location 210c synchronously with the first storage location 210a. In this example, after determining the failure point 220 is in between the data block 22e and the data block 22f of the stream of data blocks 22a-j, the data block replicator 240 stops attempting to write the data block 22f to the second storage location 210b. The data block replicator 240 begins synchronously writing the stream of data blocks 22 starting at the failure point 220 (i.e., data block 22f) to the first storage location 210a and the second storage location 210b until the end of the stream of data blocks 22 (i.e., data block 22j). Thus, the data block replicator 240 maintains a synchronous write of the stream of data blocks 22 throughout writing the entire stream of data blocks 22.

Figure 2C:
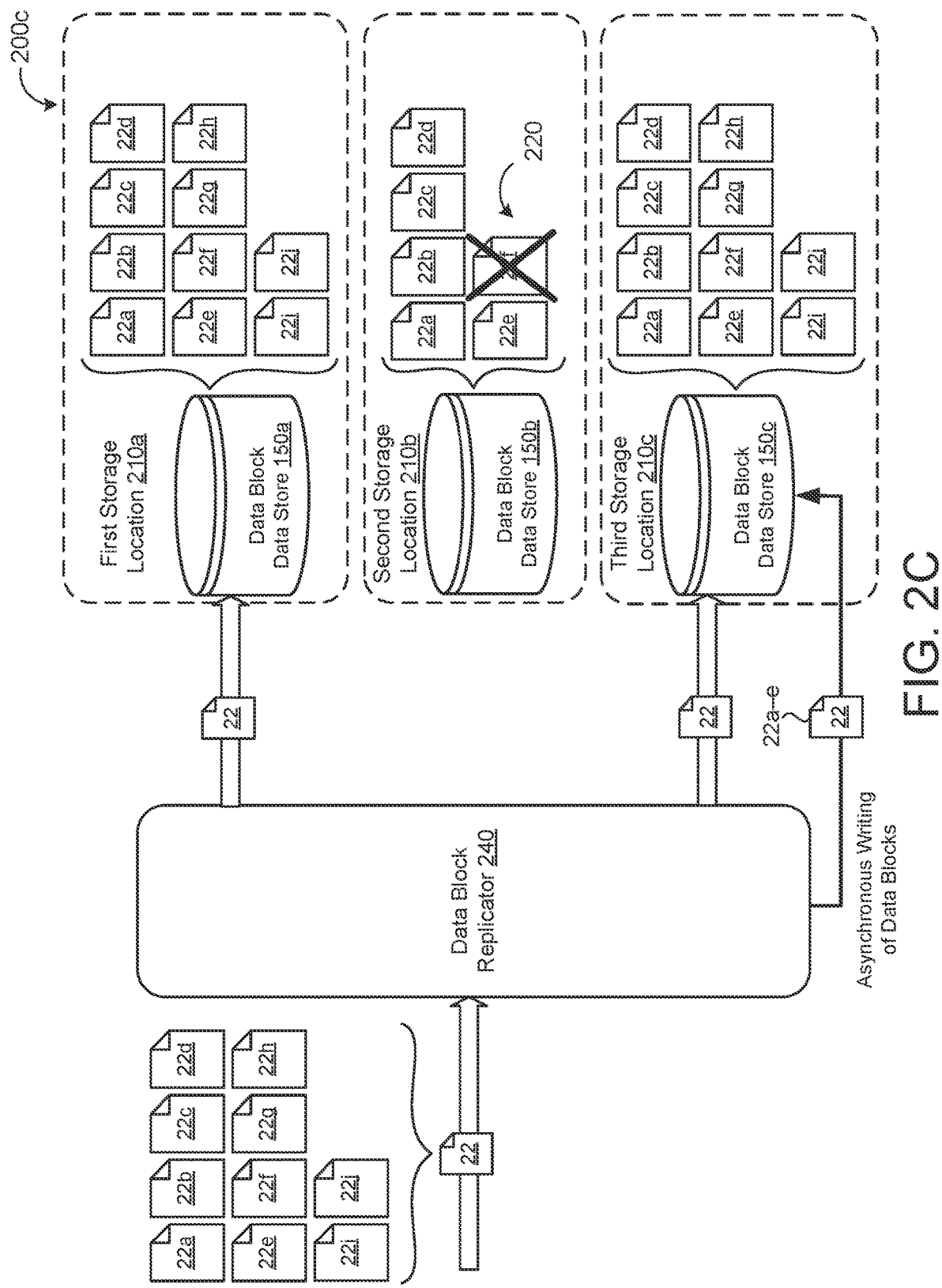
FIG. 2C is a schematic view of a recovery asynchronous replication of streaming data to the third different storage location of FIG. 2B.

Referring now to FIG. 2C, in some implementations, the data block replicator 240 asynchronously writes, from a beginning of the stream of data blocks 22 (i.e., the first data block 22 in the stream of data blocks 22) to the failure point 220, the stream of data blocks 22 to the third storage location 210c. For example, after the data block replicator 240 completes the synchronous writing of the stream of data blocks 22 to the first storage location 210a and the third storage location 210c (i.e., after data block 22j), the first storage location 210a includes data blocks 22a-j and the third storage location includes data blocks 22f-j. To complete the replication of the stream of data blocks 22 at the third storage location 210c, the data block replicator 240 asynchronously writes the remaining data blocks 22a-e to the third storage location 210c (i.e., the data blocks 22 that the data block replicator 240 successfully wrote to the second storage location 210b). After the data block replicator 240 asynchronously writes the stream data blocks 22 to the third storage location 210c, both the first storage location 210a and third storage location 210c include the entire stream of data blocks 22 (e.g., data blocks 22a-j).

In some examples, the data block replicator 240 asynchronously writes the stream of data blocks 22 to the third storage location 210c after the data block replicator 240 synchronously writes the stream of data blocks 22 to the third storage location 210c. In other examples, the data block replicator 240 asynchronously writes the stream of data blocks 22 to the third storage location 210c while the data block replicator 240 synchronously writes the stream of data blocks 22 to the third storage location 210c with the first storage location 210a.

Figure 3A:
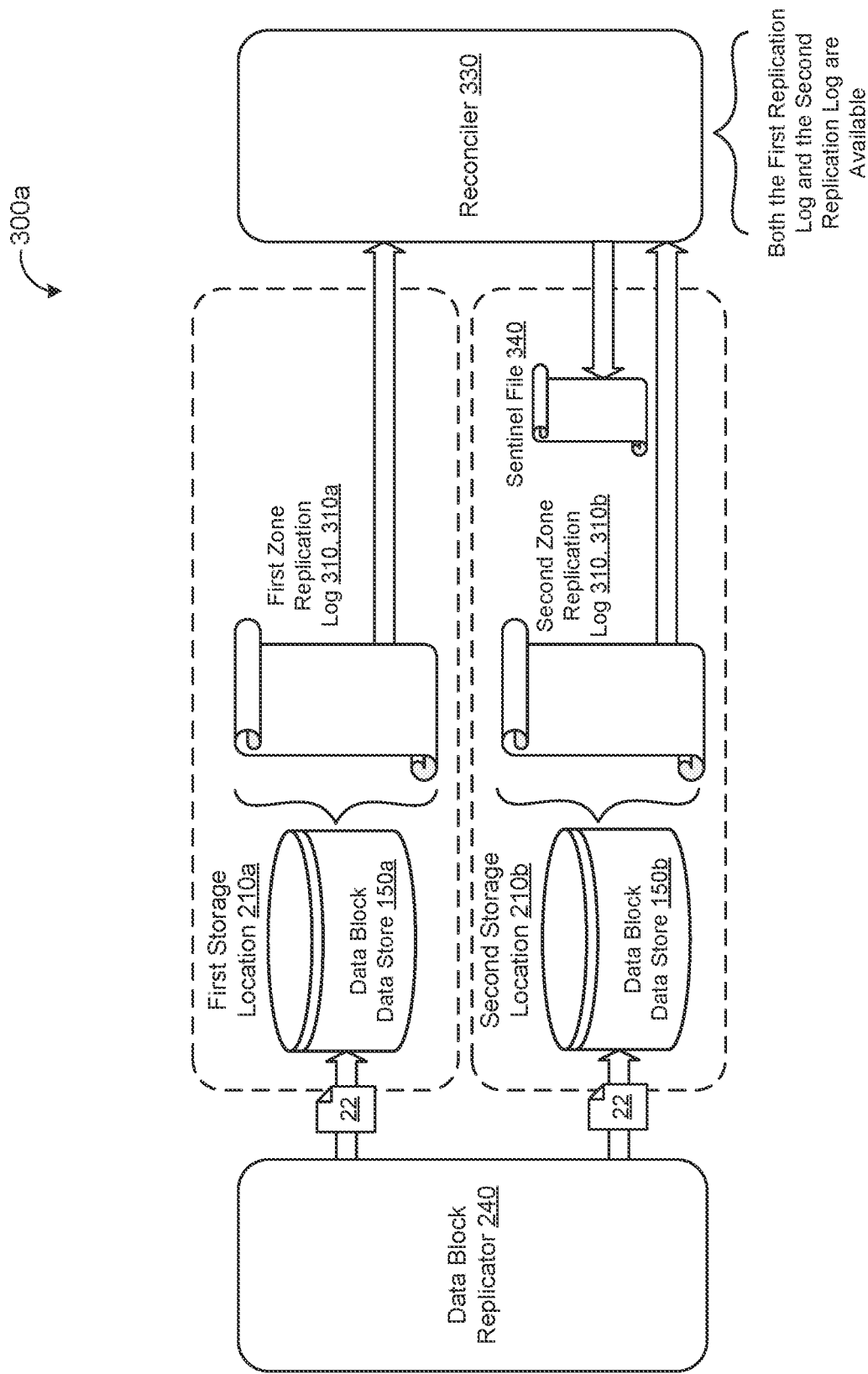
FIGS. 3A and 3B are schematic views of an example system performing data reconciliation.

Referring now to schematic view 300a of FIG. 3A, in some implementations, the remote system 140 generates a replication log 310, 310a-b for each storage location 210 and/or each data block data store 150. The replication log 310 may be the physical file that stores the data blocks 22. Alternatively, the replication log 310 may be a separate file. In this example, the remote system 140 generates a first replication log 310a that includes timestamps that indicate a write time for each data block 22 successfully written to the first storage location 210a and/or the data block data store 150a. That is, when the data block replicator 240 successfully writes a data block 22 (i.e., commits) to the storage location 210, the remote system 140 updates the corresponding replication log 310 to reflect the write (e.g., with a corresponding timestamp). On the other hand, when the data block replicator 240 fails to successfully write a data block 22 to the storage location 210, the remote system 140 does not update the corresponding replication log to reflect the write. Because each storage location 210 includes a corresponding replication log 310, the remote system 140 may use the replication logs 310 to ensure coherency between the replications.

In some examples, the remote system 140 executes a reconciler 330. The reconciler 330 may determine the failure point 220 in the stream of data blocks 22 by determining whether the first replication log 310a that indicates which data blocks 22 have been successfully committed to the first storage location 210a are available and by determining whether the second replication log 310b that indicates the data blocks 22 that have been successfully committed to the second storage location 210b are available. That is, the remote system 140 (or, in some examples, the user 10) notifies the reconciler 330 of an error and the reconciler 330 attempts to obtain both the first replication log 310a from the first storage location 210a and the second replication log 310b from the second storage location 210b. In the example of FIG. 3A, the reconciler 330 determines that both the first replication log 310a and the second replication log 310b are available.

When the first replication log 310a and the second replication log 310b are both available, the reconciler 330 reconciles the first replication log 310a and the second replication log 310b based on a length of the first replication log 310a and a length of the second replication log 310b. In some examples, the reconciler 330 determines that the replication logs 310 are the same length (i.e., the same size) and the replication logs 310 each include records of data blocks 22 after the failure point 220. This means that the remote system 140 recovered from the failure and the stream of data blocks 22 committed to both the first storage location 210a and the second storage location 210b completed successfully. In this scenario, the reconciler 330 informs the user 10 that the replication was successful.

In other examples, the reconciler 330 determines that the length of the second replication log 310b is less than the length of the first replication log 310a (i.e., the size of the second replication log 310b is less than the size of the first replication log 310a). This scenario indicates that either there is currently an "inflight" write between the data block replicator 240 and the second storage location 210b causing the different lengths in the replication logs 310a, 310b or there is no inflight write and the second storage location 210b has suffered a failure. That is, the data block replicator 240 successfully wrote a data block 22 to the first storage location 210a and failed to write the corresponding replicated data block 22 to the second storage location 210b. Because typically the remote system 140 and/or user 10 does notify the reconciler 330 of a failure until after waiting a threshold period of time, the reconciler 330 may assume that there is no inflight write. Continuing the example of FIGS. 2A-2C, the reconciler 330 determines that the length of the first replication log 310a (which includes entries for the writes of data blocks 22a-f) is longer than the length of the second replication log 310b (which includes entries for the writes of data blocks 22a-e).

After the reconciler 330 determines that the length of the first replication log 310a is different than the length of the second replication log 310b, the reconciler 330 performs a reconciliation process (e.g., a forced finalization). The reconciler 330 may reconcile the first replication log 310a and the second replication log 310b by determining an index of the second replication log 310b associated with the unrecoverable failure (e.g., a location of the unrecoverable failure or the failure point 220). After the reconciler 330 determines the index of the second replication log 310b, the reconciler 330 may store the index of the second replication log 310b at the memory hardware 146. That is, the remote system 140 may store the length of the replication log for future reference. In some implementations, the reconciler 330 finalizes the second replication log 310b to prohibit further writes to the second storage location 210b and generates a sentinel file 340 to indicate a need for reconciliation.

In some examples, the data block replicator 240 engages a separate stream server or worker (i.e., a processing task or thread) that is responsible for writing the data blocks 22 to the storage location 210. In the event that the worker temporarily fails to write a data block 22, but remains active (i.e., a "zombie" worker), the worker may attempt to continue writing data blocks 22 to the second storage location 210b even after the data block replicator 240 has determined an unrecoverable failure and began writing the stream of data blocks 22 to the third storage location 210c. When this zombie worker encounters the finalized replication log 310, the worker is incapable of actually committing any additional writes to the replication log 310. Furthermore, the sentinel file 340 serves as a notice to the worker to abort ownership of the log file.

Figure 3B:
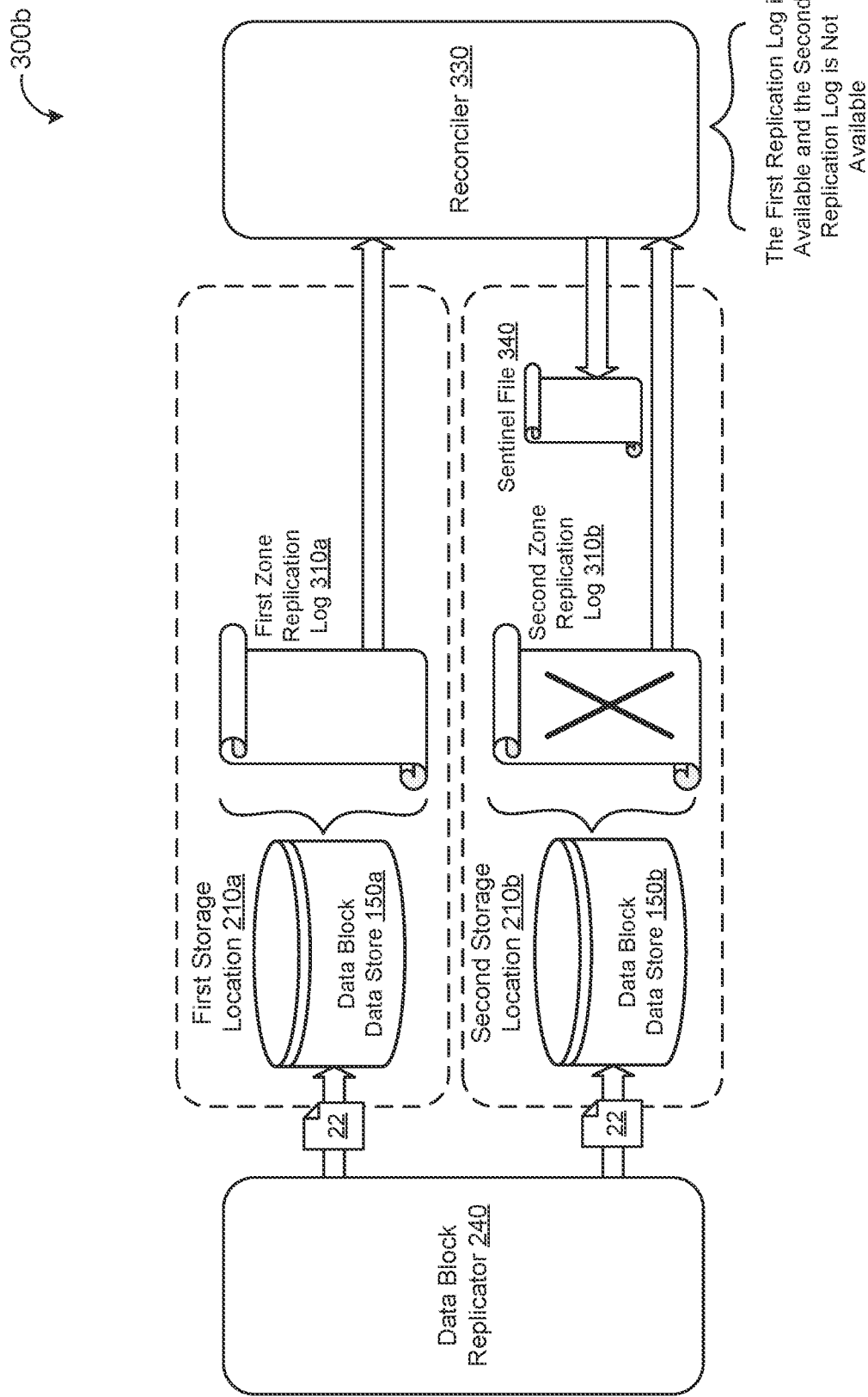

Referring now to FIG. 3B, in some examples, when the first replication log 310a is available and the second replication log 310b is not available (or vice versa), the reconciler 330 again reconciles the first replication log 310a and the second replication log 310b based on the length of the first replication log 310a. For example, when the unrecoverable failure is such that the second storage location 210b is unreachable, the second replication log 310b is similarly unreachable. In this instance, the reconciler 330 cannot compare the lengths of the first replication log 310a and the second replication log 310b and therefore relies on the length of just the first replication log 310a. Similarly, when the first replication log 310a is not available and the second replication log is available, the reconciler 330 may reconcile, based on the length of the second replication log 310b, the first replication log 310a and the second replication log 310b.

The reconciler 330 may rely on only the length of the available replication log 310 because the reconciler 330 will successfully reconcile whether the available replication log 310 is longer or shorter than the unavailable replication log 310. When the available replication log 310 is shorter than the unavailable replication log 310, this can only occur when the failure occurs after the data block 22 is written to the storage location 210, but before the data block 22 is committed to the storage location. Thus, the reconciler 330 is safe to assume that the "extra" data block 22 that increased the length of the unavailable replication log 310 is not committed.

On the other hand, when the available replication log 310 is longer than the unavailable replication log 310, the additional data block 22 that was written to the available storage location 210 corresponds to a write that failed (e.g., a write that failed with an internal error such as an HyperText Transfer Protocol (HTTP) 500 error). The reconciler 330 may safely assume this data is committed as long as the remote system 140 consistently serves the data block 22 on all reads.

Figure 4:
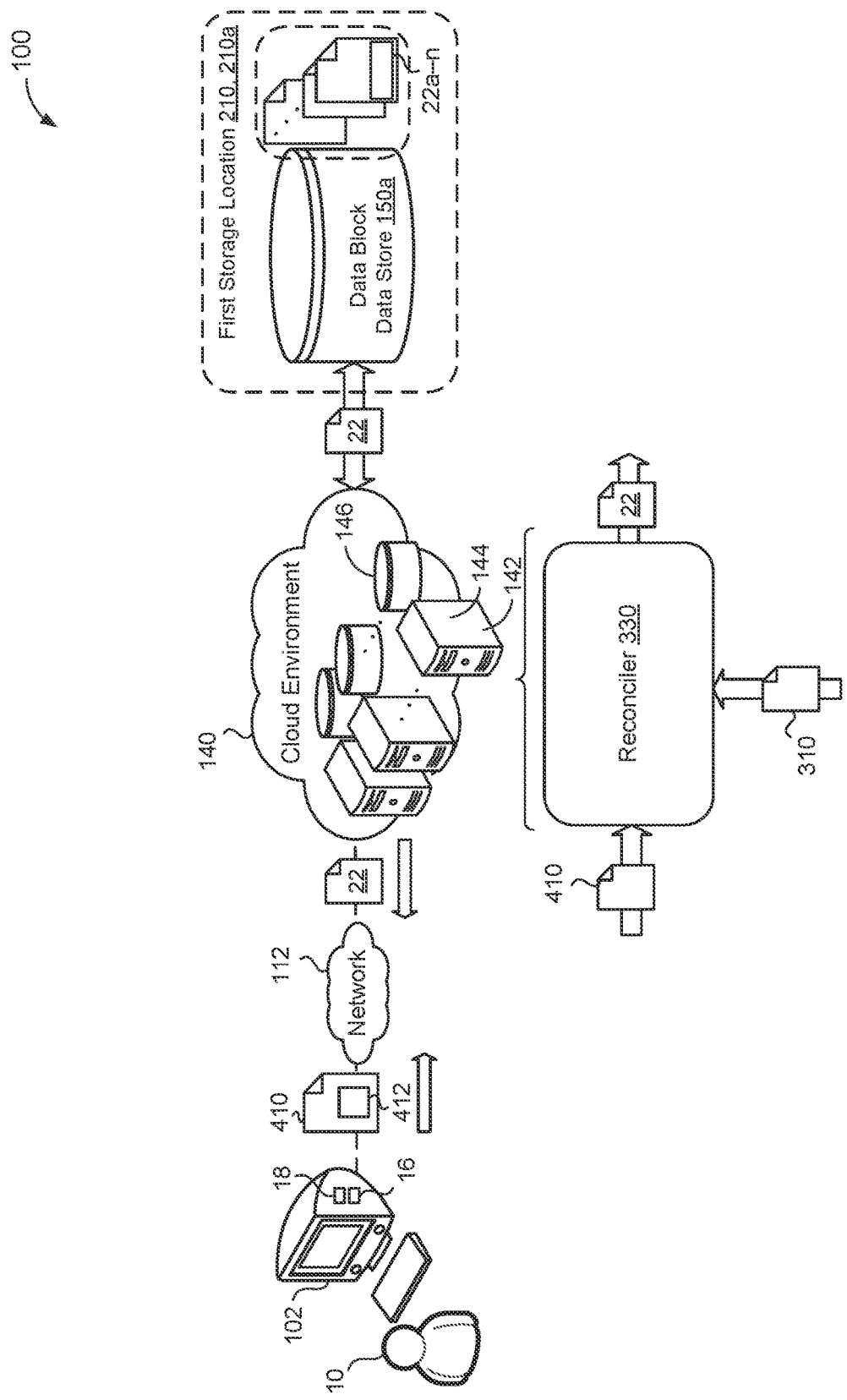
FIG. 4 is a schematic view of the system of FIG. 1 receiving a query request.

Referring now to FIG. 4, in some examples, the remote system 140 receives a query request 410 requesting return of a plurality of data blocks 52 stored at the first storage location 210a (i.e., the primary storage location 210). The query request 410 may include one or more parameters that define what data block 22 to return such as one or more keywords. The parameters include a snapshot read timestamp 412. The snapshot read timestamp 412 specifies a point in time for the remote system 140 to read the data block data store 150. The remote system 140 correlates the snapshot read timestamp 412 with the timestamp associated with each data block 22 in the replication log 310 as the timestamp in the replication log 310 indicates at what point in time the data block 22 was committed to the data block data store 150. For example, the remote system 140 does return data block 22 that the data block replicator 240 wrote to the data block data store 150 after the snapshot read timestamp 412. When the query request 410 does not include a snapshot read timestamp 412, the remote system 140 may default the snapshot read timestamp 412 to the current time.

Because the timestamps added to the replication log 310 as data blocks 22 are committed to the data block data store 150 monotonically increase, when the remote system 140 reads the replication log 310, once the remote system 140 encounters a data block 22 with a commit timestamp that is greater than the snapshot read timestamp 412, the remote system 140 can safely assume that all further records in the replication log 310 will also have a timestamp larger than the snapshot read timestamp 412 and thus the remote system 140 may stop reading the replication log 310. However, when the last record in the replication log 310 is associated with a data block 22 with a timestamp that is not greater than the snapshot read timestamp 412, the remote system 140 may not make any assumptions about the last data block 22. This is because the last data block 22 may be the result of a failed write and thus not have been successfully replicated to the other storage location 210. Thus, the remote system 140, prior to serving the last data block 22, must first ensure that any other subsequent reads with a snapshot read timestamp 412 equal to or greater than the current snapshot read timestamp 412 will also consistently serve the last data block 22. To this end, the reconciler 330 may reconcile reads from query requests 410.

In some implementations, the reconciler 330 reconciles, based on a length of the first replication log 310a and a length of the second replication log 310b, the first replication log 310a and the second replication log 310b. In some examples, the reconciler 330 first determines that the length of the second replication log 310b is not available and the reconciler 330 determines that, within a threshold period of time, a subsequent write is added to the first replication log 310a. That is, to reconcile the state, the reconciler 330 determines the length of the replication logs 310a, 310b and when both are the same, the reconciler 330 determines that the last data block in the first replication log 310a is committed and complete. However, when either replication log 310a, 310b is unavailable or unreachable, the reconciler 330 may wait for a small amount of time (e.g., for fifty milliseconds) for a subsequent write to appear in the available replication log 310. In this example, the remote system (e.g., the stream servers of the data block replicator 240) performs periodic "keep-alive" writes to inactive replication logs 310 (e.g., every fifty milliseconds).

When a subsequent write does appear in the replication log 310, the reconciler 330 may assume that replicated writes are occurring and thus that the previous data block 22 write was successful. Because this write will be associated with a timestamp that is greater than the snapshot read timestamp of the query request 410, the reconciler 330 may safely assume that all data blocks 22 (i.e., the last data block 22 in the replication log 310) are safe to serve. When a subsequent write does not appear after waiting for the small amount of time, the reconciler 330 retrieves any stored replication log length from previous reconciliations to determine whether the last data block 22 should be served. That is, when the data block 22 is at an index that is greater than the stored length from the previous reconciliation, the remote system 140 will not serve the last data block 22. However, when the last data block 22 has an index that is the same or less than the stored length from the previous reconciliation, the remote system 140 will serve the last data block 22. After any necessary reconciliation, the remote system 140 returns, based on the reconciliation of the first replication log 310a and the second replication log 310b, the requested plurality of data blocks 22.

In some implementations, the remote system 140 receives multiple query requests 410 that each require reconciliation of the last data block 22. In this scenario, only one of the query requests 410 will determine the final committed length of the replication log 310 and all of the other query requests 410 will be processed by the remote system 140 using the same final committed length. Thus, the remote system 140 offers consensus replication.

Figure 5:
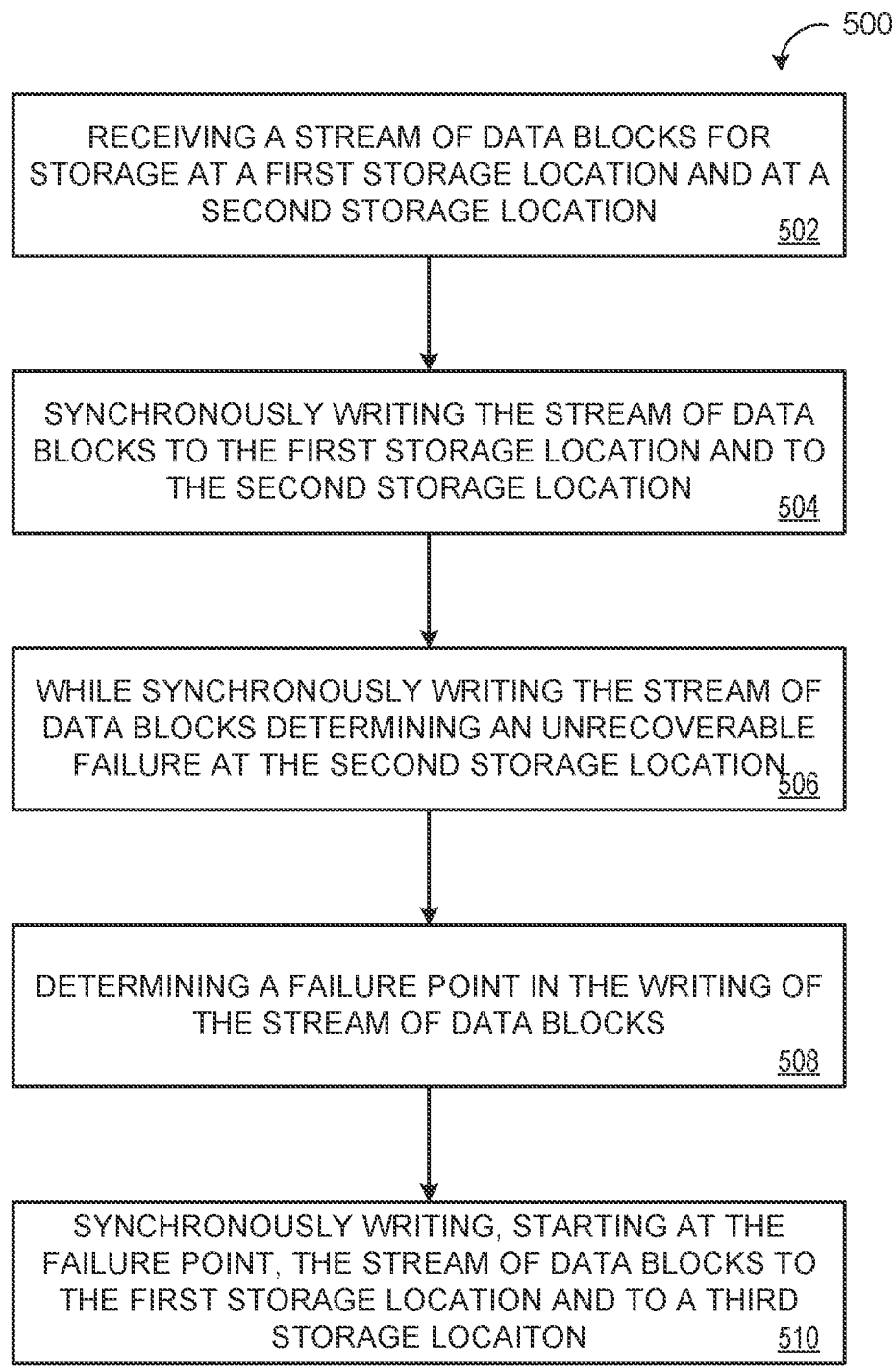
FIG. 5 is a flowchart of an example arrangement of operations for a method of synchronous replication of streaming data.

FIG. 5 is a flowchart of an exemplary arrangement of operations for a method 500 for synchronous replication of high throughput streaming data. The method 500, at step 502, includes receiving, at data processing hardware 144, a stream of data blocks 22 for storage at a first storage location 210a of a distributed storage system and at a second storage location 210b of the distributed storage system. The first storage location 210a is associated with a first geographical region and the second storage location is associated with a second geographical region different from the first geographical region. The method 500, at step 504, includes synchronously writing, by the data processing hardware 144, the stream of data blocks 22 to the first storage location 210a and to the second storage location 210b. While synchronously writing the stream of data blocks 22 to the first storage location 210a and to the second storage location 210b, the method 500, at step 506, includes determining, by the data processing hardware 144, an unrecoverable failure at the second storage location 210b that prohibits further writing of the stream of data blocks 22 to the second storage location 210b.

The method 500, at step 508, includes determining, by the data processing hardware 144, a failure point 220 in the writing of the stream of data blocks 22. The failure point 220 demarcates data blocks 22 that were successfully written to the second storage location 210b and data blocks 22 that were not successfully written to the second storage location 210b. The method 500, at step 510, includes synchronously writing, by the data processing hardware 144, starting at the failure point 220, the stream of data blocks 22 to the first storage location 210a and to a third storage location 210c of the distributed storage system. The third storage location 210c is associated with a third geographical region different than the first geographical region and the second geographical region.

Figure 6:
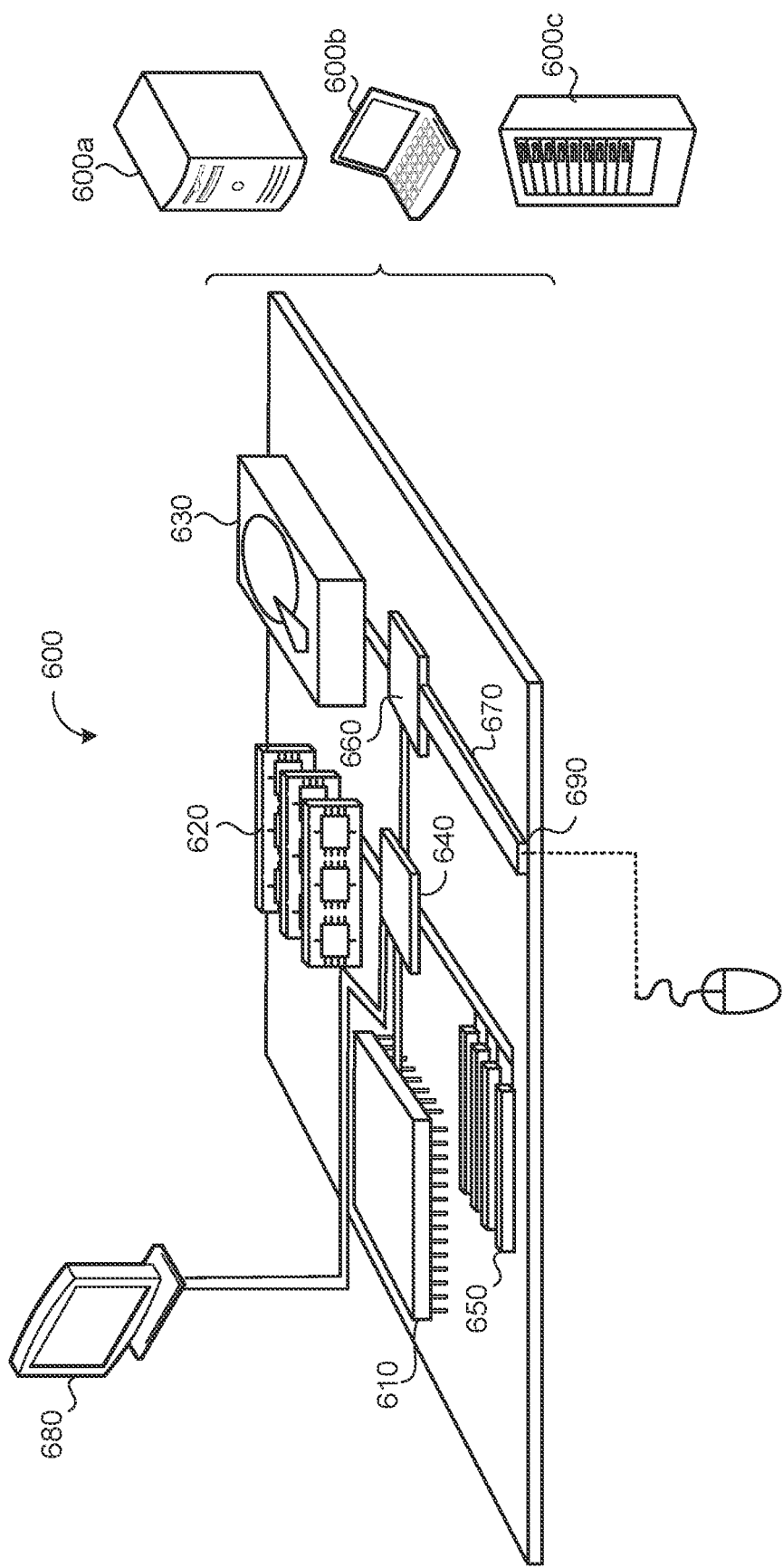
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

receiving, at a data block replicator, a stream of data blocks for storage at a first storage location of a distributed storage system and at a second storage location of the distributed storage system, the first storage location associated with a first geographical region and the second storage location associated with a second geographical region different than the first geographical region;

synchronously writing, from the data block replicator, the stream of data blocks to the first storage location and to the second storage location;

while synchronously writing the stream of data blocks to the first storage location and to the second storage location, determining an unrecoverable failure at the second storage location that prohibits further writing of the stream of data blocks to the second storage location;

determining a failure point in the writing of the stream of data blocks, the failure point demarcating data blocks that were successfully written to the second storage location and data blocks that were not successfully written to the second storage location;

synchronously writing, from the data block replicator and starting at the failure point, the stream of data blocks to the first storage location and to a third storage location of the distributed storage system simultaneously, the third storage location associated with a third geographical region different than the first geographical region and the second geographical region; and based on determining the unrecoverable failure at the second storage location and after synchronously writing the stream of data blocks to the third storage location, asynchronously writing, from a beginning of the stream of data blocks to the failure point of the stream of data blocks, the data blocks to the third storage location from the data block replicator.

2. The method of claim 1, wherein determining the unrecoverable failure at the second storage location that prohibits further writing of the stream of data blocks to the second storage location comprises:
   determining a failure of the writing of the stream of data blocks to the second storage location;
   in response to determining the failure of writing the stream of data blocks to the second storage location, retrying writing the stream of data blocks to the second storage location;
   determining that retrying writing the stream of data blocks to the second storage location has failed; and
   in response to determining that retrying writing the stream of data blocks to the second storage location has failed, determining that the failure is an unrecoverable failure.

3. The method of claim 1, wherein determining the failure point in the writing of the stream of data blocks comprises reconciling a first replication log corresponding to the first storage location and a second replication log corresponding to the second storage location.

4. The method of claim 3, wherein reconciling the first replication log and the second replication log comprises reconciling, based on a length of the first replication log and a length of the second replication log, the first replication log and the second replication log.

5. The method of claim 3, wherein reconciling the first replication log and the second replication log comprises:
   determining an index of the second replication log associated with the unrecoverable failure;
   storing the index of the second replication log on memory hardware in communication with the data processing hardware;
   finalizing the second replication log to prohibit further writes to the second storage location; and
   generating a sentinel file to indicate a need for reconciliation.

6. The method of claim 1, wherein the operations further comprise returning an indication of the unrecoverable failure at the second storage location to a client device associated with a user.

7. The method of claim 6, where in the indication of the unrecoverable failure at the second storage location comprises one or more of:
   the failure point;
   a number of data blocks that were successfully written to the second storage location; or
   an identification of the second storage location.

8. The method of claim 1, wherein asynchronously writing the data blocks that were successfully written to the second storage location to the third storage location is performed after synchronously writing the stream of data blocks to the first storage location and to the third storage location.

9. The method of claim 1, wherein asynchronously writing the data blocks that were successfully written to the second storage location to the third storage location is performed simultaneously while synchronously writing the stream of data blocks to the first storage location and to the third storage location.

10. A system comprising:
    data processing hardware; and
    memory hardware in communication with the data processing hardware, the memory hardware storing instructions that when executed on the data processing hardware cause the data processing hardware to perform operations comprising:
       receiving, at a data block replicator, a stream of data blocks for storage at a first storage location of a distributed storage system and at a second storage location of the distributed storage system, the first storage location associated with a first geographical region and the second storage location associated with a second geographical region different than the first geographical region;
       synchronously writing, from the data block replicator, the stream of data blocks to the first storage location and to the second storage location;
       while synchronously writing the stream of data blocks to the first storage location and to the second storage location, determining an unrecoverable failure at the second storage location that prohibits further writing of the stream of data blocks to the second storage location;
       determining a failure point in the writing of the stream of data blocks, the failure point demarcating data blocks that were successfully written to the second storage location and data blocks that were not successfully written to the second storage location;
       synchronously writing, from the data block replicator and starting at the failure point, the stream of data blocks to the first storage location and to a third storage location of the distributed storage system simultaneously, the third storage location associated with a third geographical region different than the first geographical region and the second geographical region; and
       based on determining the unrecoverable failure at the second storage location and after synchronously writing the stream of data blocks to the third storage location, asynchronously writing, from a beginning of the stream of data blocks to the failure point of the stream of data blocks, the data blocks to the third storage location from the data block replicator.

11. The system of claim 10, wherein determining the unrecoverable failure at the second storage location that prohibits further writing of the stream of data blocks to the second storage location comprises:
    determining a failure of the writing of the stream of data blocks to the second storage location;
    in response to determining the failure of writing the stream of data blocks to the second storage location, retrying writing the stream of data blocks to the second storage location;
    determining that retrying writing the stream of data blocks to the second storage location has failed; and
    in response to determining that retrying writing the stream of data blocks to the second storage location has failed, determining that the failure is an unrecoverable failure.

12. The system of claim 10, wherein determining the failure point in the writing of the stream of data blocks comprises reconciling a first replication log corresponding to the first storage location and a second replication log corresponding to the second storage location.

13. The system of claim 12, wherein reconciling the first replication log and the second replication log comprises reconciling, based on a length of the first replication log and a length of the second replication log, the first replication log and the second replication log.

14. The system of claim 12, wherein reconciling the first replication log and the second replication log comprises:
   determining an index of the second replication log associated with the unrecoverable failure;
   storing the index of the second replication log on memory hardware in communication with the data processing hardware;
   finalizing the second replication log to prohibit further writes to the second storage location; and
   generating a sentinel file to indicate a need for reconciliation.

15. The system of claim 11, wherein the operations further comprise returning an indication of the unrecoverable failure at the second storage location to a client device associated with a user.

16. The system of claim 15, where in the indication of the unrecoverable failure at the second storage location comprises one or more of:
   the failure point;
   a number of data blocks that were successfully written to the second storage location; or
   an identification of the second storage location.

17. The system of claim 10, wherein asynchronously writing the data blocks that were successfully written to the second storage location to the third storage location is performed after synchronously writing the stream of data blocks to the first storage location and to the third storage location.

18. The system of claim 10, wherein asynchronously writing the data blocks that were successfully written to the second storage location to the third storage location is performed simultaneously while synchronously writing the stream of data blocks to the first storage location and to the third storage location.

* * * * *